Oct. 1, 1963   M. A. POLSTER   3,105,953
DIRECTIONAL SONIC VEHICLE DETECTOR
Filed Jan. 25, 1960   6 Sheets—Sheet 1
FIG. IA.
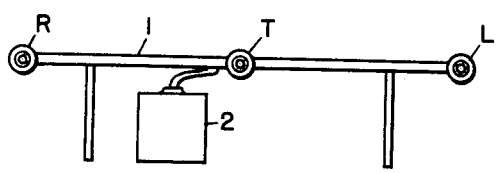
FIG. IB.
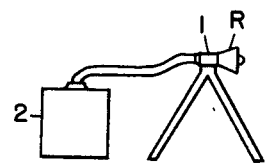
FIG. 2A.
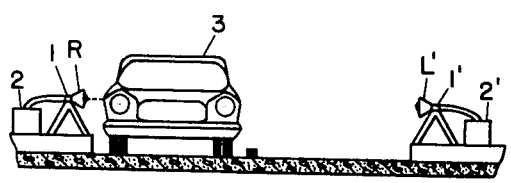
FIG. 3A.
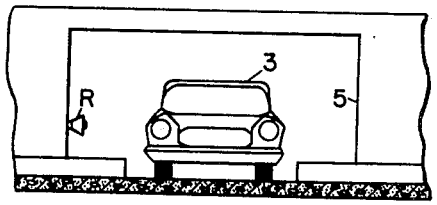
FIG. 2B.
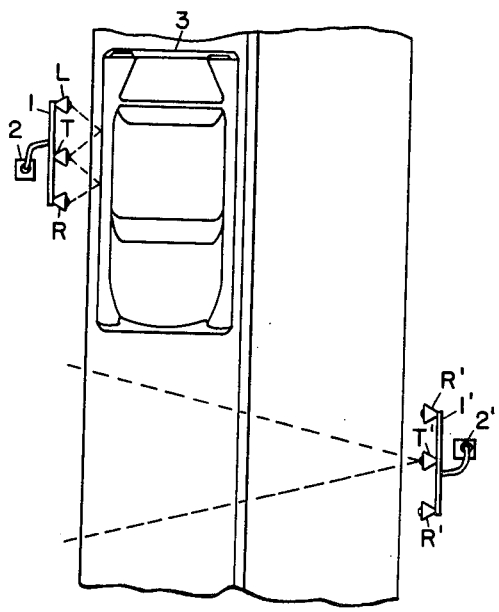
FIG. 3B.
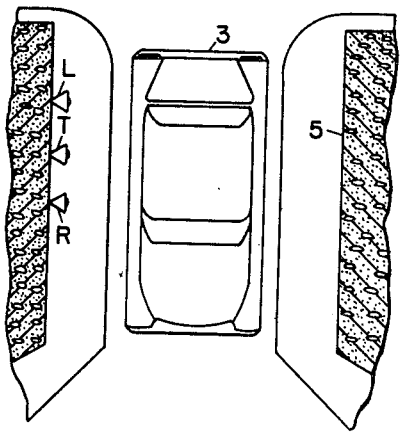
INVENTOR.
M. A. POLSTER
BY
*Forest B. Hitchcock*
HIS ATTORNEY Oct. 1, 1963  M. A. POLSTER  3,105,953
DIRECTIONAL SONIC VEHICLE DETECTOR
Filed Jan. 25, 1960  6 Sheets-Sheet 2

INVENTOR.
M. A. POLSTER
BY
*Forest D. Hitchcock*
HIS ATTORNEY

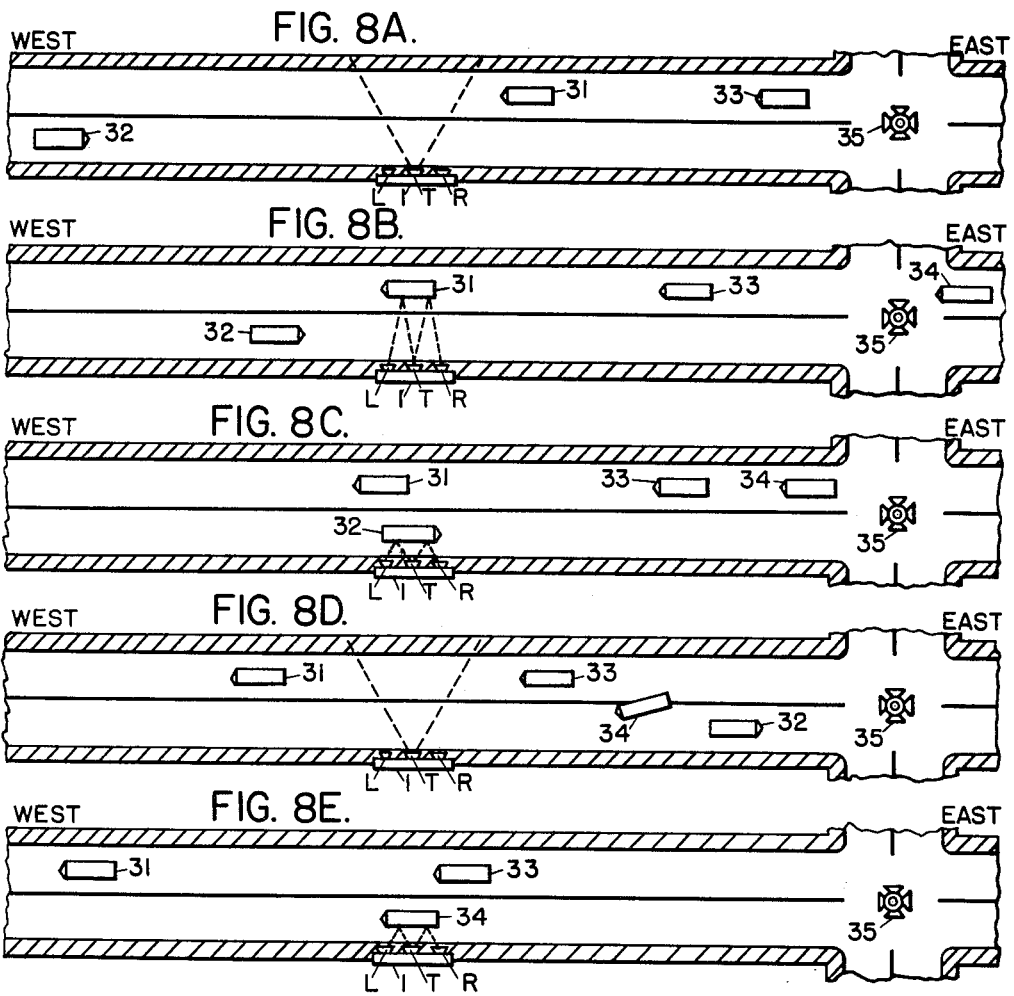
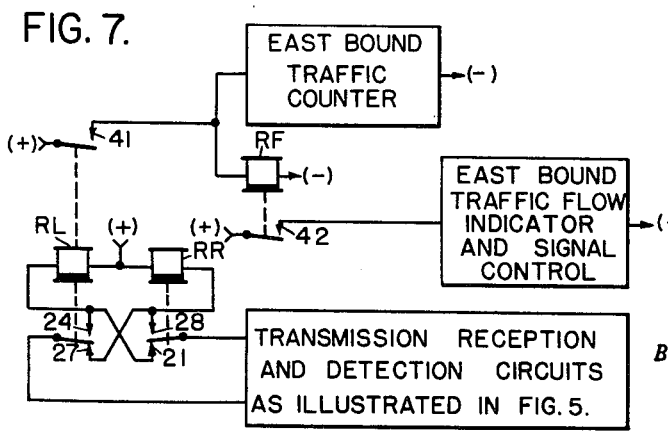

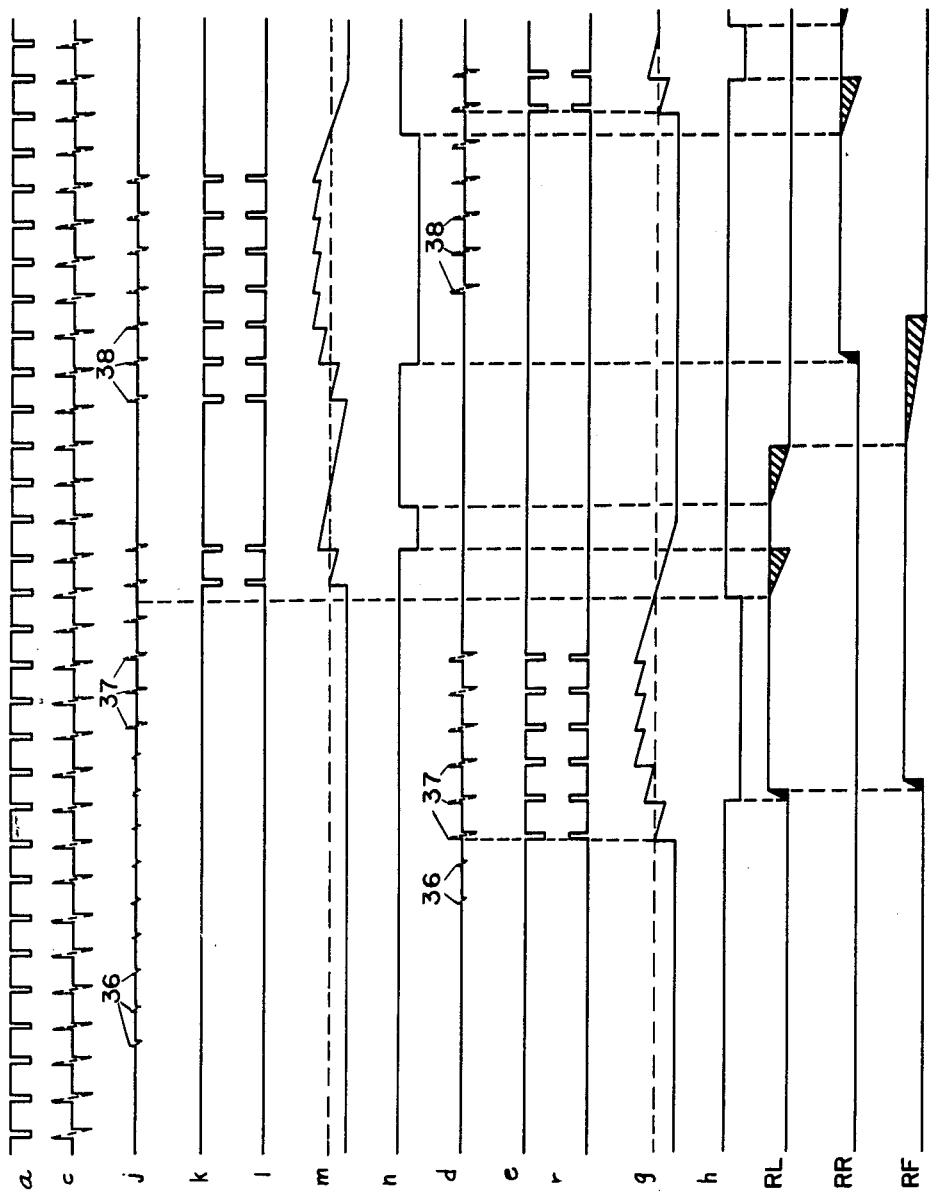

United States Patent Office 3,105,953
Patented Oct. 1, 1963

3,105,953
DIRECTIONAL SONIC VEHICLE DETECTOR
Morton A. Polster, Rochester, N.Y., assignor to General
Signal Corporation, a corporation of New York
Filed Jan. 25, 1960, Ser. No. 4,484
4 Claims. (Cl. 340—39)

This invention relates to the detection of objects by sonic means and more particularly to sonic apparatus for the detection and counting of automotive traffic in accordance with its direction of travel.

The steady increase in the number of vehicles on the highways has created serious problems relating to the adequate handling and control of traffic in both rural and metropolitan areas. Traffic engineers must have accurate information as to the numbers of vehicles using given highways at any particular time in order to provide adequate improvements for handling that traffic and in order to operate traffic signals and other devices used for controlling the flow of traffic. Therefore, there is definite need for devices which can automatically monitor the traffic in any given area, at any particular time. Particularly, metropolitan areas are faced with the problem of handling heavy loads of traffic in parking facilities utilizing a single passageway for both ingress and egress, and there is definite need for accurate information as to the number of parking spaces available in a particular area at any given time.

The invention herein provides a system for accurately determining the flow of vehicles traveling on a dual direction highway, providing an accurate count of the vehicles traveling in one particular direction and disregarding all those vehicles traveling in the opposite direction. The system disclosed herein can also be adapted to monitor a single lane passageway which is utilized for both ingress and egress to a particular area, the system maintaining accurate and separate counts of the vehicles traveling in each direction through the passageway.

In the invention disclosed herein, pulsed sonic energy is beamed across the highway or passageway to be monitored. Receivers located adjacent to and on opposite sides of the transmitting apparatus are separately responsive to pulses of sonic energy reflected from the surfaces of passing vehicles. Vehicles approaching from one direction will cause pulses to be reflected first to one of the receiving units, while vehicles passing in the opposite direction will cause pulses to be reflected first to the other receiving unit. Received reflected pulses are converted into electrical signals and are passed on to detection circuits which provide a distinctive indication upon receipt of a successive train of signals. As soon as a series of pulses has been reflected to one of the receivers, the detection circuits cause the other receiver to become non-responsive to reflected sonic pulses. In this way, the vehicle traveling in one direction produces a distinctive indication in only one detection circuit, while a vehicle passing from the opposite direction causes an indication in only the other detection circuit.

Since the magnitude of reflected pulses varies inversely with the distance the pulses travel through the air, the highway adaptation of the invention herein distinguishes pulses reflected from distant objects, or from vehicles passing in non-monitored lanes, on this basis.

In the adaptation of the invention to monitoring a single lane passageway, the vehicles to be monitored pass between the transmitting transducer and a reflective barrier. Pulses reflected from the barrier are gated out, while the detection circuits remain responsive to pulses reflected from the surface of passing vehicles.

Under other methods utilizing sonic energy for traffic control purposes, the repetition rate of transmitted pulses must be limited to allow for the receipt of reflections from non-monitored lanes following each transmission pulse, thereby to assure that these "spurious" reflections will be gated "out." The invention herein overcomes this limitation, and one of its major advantages, when adapted for highway use, is that the pulse repetition rate of the transmitter may be increased to permit the detection of extremely high speed traffic. This is possible since the vehicles traveling in the non-monitored lanes of the highway, or in the non-monitored direction, are discriminated on the basis of their direction of travel and their distance from the transmitter as evidenced by the strength of their reflections rather than on the basis of distance expressed as lapsed time.

It is an object of this invention to provide a simple and economical system for detecting high speed automotive traffic in accordance with its direction of travel.

It is a further object of this invention to provide a system for monitoring objects traveling in one direction only through a passageway wide enough to permit a simultaneous passage of objects in more than one direction.

It is a further object of this invention to provide a system for detecting and counting the vehicles traveling through a designated passageway in accordance with their direction of travel.

It is a further object of this invention to provide a sonic system for the detection of high speed automotive traffic wherein traffic flowing in a non-monitored direction or in a non-monitored lane is distinguished on the basis of its direction of travel as well as its remoteness from the sound transmitter.

Other objects, purposes and characteristic features of the present invention will be in part obvious from the accompanying drawings and in part pointed out as the description of the invention progresses.

In describing the invention in detail reference will be made to the accompanying drawings in which like reference characters designate corresponding parts throughout the several views, and in which:

FIGS. 1A and 1B are two views of the invention showing the general alignment of the transmitting transducer and the two receiving transducers;

FIGS. 2A and 2B are two views of the invention set up at a roadside for monitoring traffic traveling in each direction;

FIGS. 3A and 3B are two views of the invention adapted to monitor a single lane passageway utilized for both ingress and egress to a particular area;

FIG. 7 illustrates the simple adaptation of the invention herein as a flow indication and directional traffic counter monitoring a multiple lane highway;

FIGS. 8A, 8B, 8C, 8D and 8E illustrate in sequence certain assumed traffic conditions on a highway being monitored by the adaptation of the invention illustrated in FIG. 7; and FIG. 9 is a chart showing waveforms taken at various points in the circuit as illustrated in FIG. 5 in response to the varying sets of circumstances illustrated in FIGS. 8A through 8E.

For the purpose of simplifying the illustration and facilitating in the explanation, the various parts and circuits constituting the embodiment of the invention have been shown by means of block diagrams, each block representing simple circuits well-known in the art, the drawings having been made more with the purpose of making it easy to understand the principles and mode of operation than with the idea of illustrating the specific construction and arrangement of parts that would be employed in practice.

As can be seen in FIGS. 1A and 1B, the invention herein is readily contained in a portable unit including a tubular stand unit 1 on which are mounted a transmitting transducer T, and two receiving transducers L and R. The receiving transducers L and R are spaced equidistant from transmitting transducer T and in general alignment therewith. The other circuit components, including the counters and a battery power supply, are encased in equipment case 2 and are connected by means of cable to the three transducers. (It should be obvious that this unit need not be self-contained. The power supply may be external and cable connections may be provided for purposes of remote indications and traffic control.)

It is believed that the nature of the invention, its advantages and characteristic features, can be best understood by the description being set forth from the standpoint of operation based upon assumed fact situations. The circuit will first be described assuming that it is adapted for use in monitoring a single lane passageway servicing a parking area, the single lane being utilized for both ingress and egress. Thereafter, the invention will be described based upon the assumption that it is being adapted to monitor the traffic flowing in one direction only along a dual-direction highway.

*Adaption for Monitoring Parking Area*

It will now be assumed that the invention herein is set up in the manner illustrated in FIGS. 3A and 3B, and it will further be assumed vehicle 3 is entering the area through the passageway in the manner illustrated in FIGS. 4A through 4D.

Figure 5:
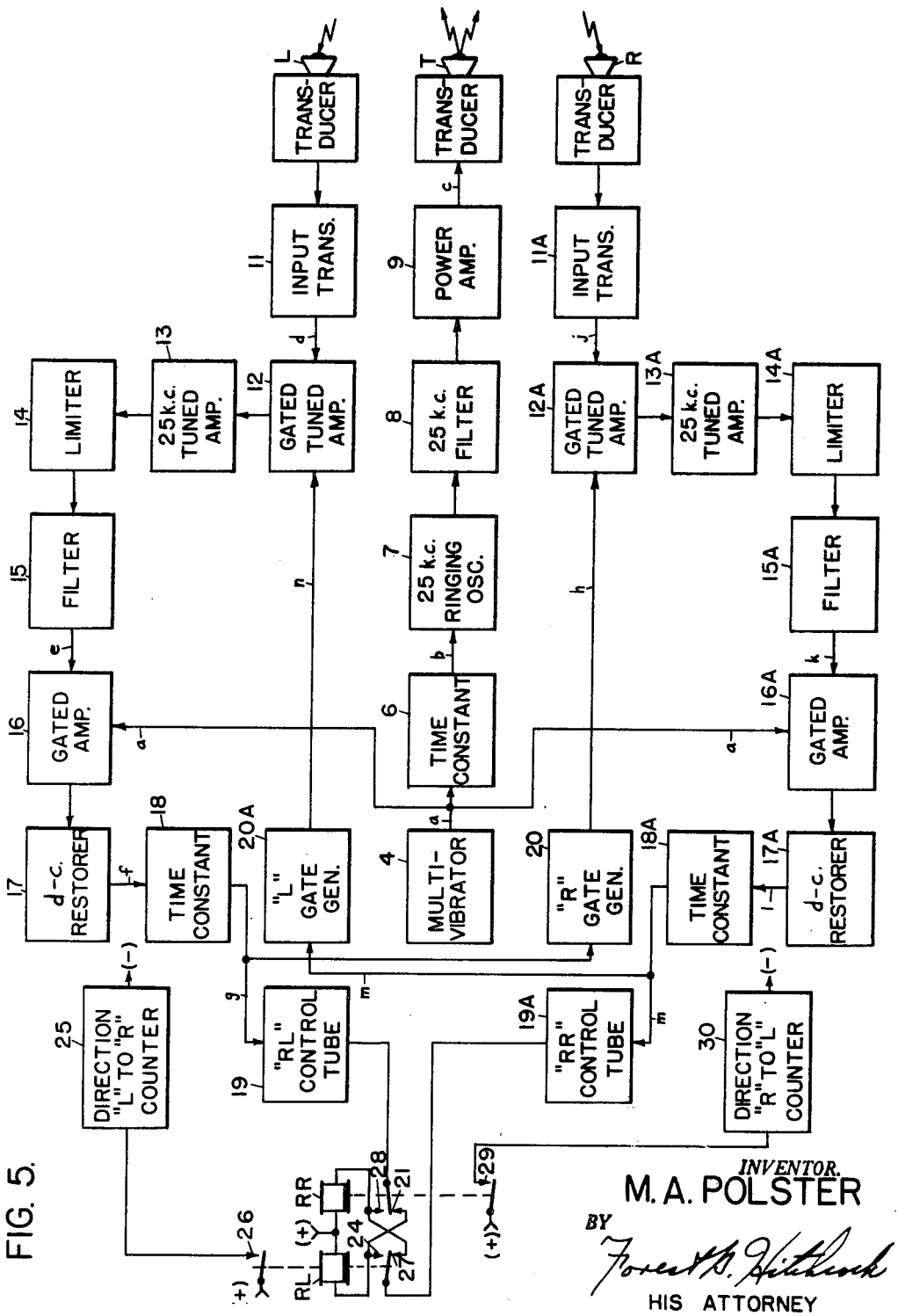
FIG. 5 is a block diagram of the circuits comprising the invention herein.

Referring now to FIG. 5, multivibrator 4 is designed to operate asymmetrically with its pulse repetition rate being slightly shorter than the time required for sound to travel from transducer T to reflective barrier 5 and then back to receiving transducers L and R. An output is taken from one of the plates of multivibrator 4, and the negative-going portion of the square wave output is fed to time constant 6. The size of time constant 6 determines the width of each pulse transmitted by transducer T, and it may be assumed that this time constant is in the neighborhood of one millisecond. Time constant 6 is in the grid circuit of ringing oscillator 7 and cuts off the conduction of the tube in the oscillator circuit, resulting in the production of a one millisecond pulse of 25 kc. frequency.

The one millisecond pulses are produced at the pulse repetition rate of multivibrator 4 and are passed through filter 8 and power amplifier 9 to transducer T. Transducer T converts the electrical signals into pulses of ultrasonic energy which it beams across the passageway in such a manner that the pulses may impinge on reflective barrier 5 and be reflected back to receiving transducers L and R.

Figure 6:
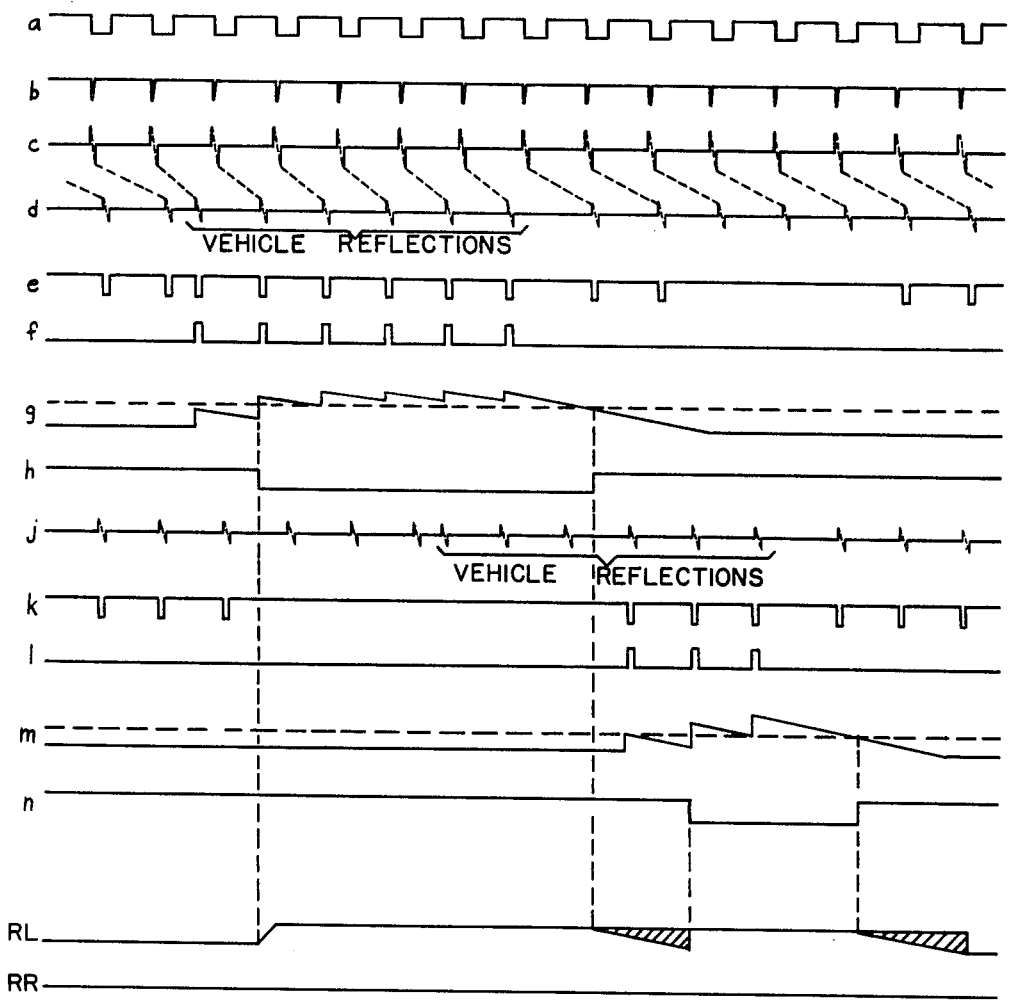
FIG. 6 is a chart showing waveforms at particular points of the circuit illustrated in FIG. 5 assuming the passage of a vehicle as illustrated in FIGS. 4A through 4D.

FIG. 6 shows waveforms taken at various points in the circuit illustrated in FIG. 5, and reference can be made to these waveforms to facilitate understanding of this description. Waveform "a" illustrates the asymmetrical square wave output of multivibrator 4, while waveforms "b" and "c" illustrate, respectively, the time constant at the grid of ringing oscillator 7 and the resulting one millisecond pulses of 25 kc. energy produced by power amplifier 9.

Reflected pulses received by transducers L and R pass through input transformers 11 and 11A respectively (waveforms "d" and "j"). These signals next pass through tuned amplifiers 12 and 13, and 12A and 13A, respectively. Tuned amplifiers 12 and 12A are gated and will be referred to again below. After the reflected signals have been sufficiently amplified, they are fed to limiter circuits 14 and 14A which are designed to pass only the negative peaks of these signals. Filters 15 and 15A remove the 25 kc. frequency leaving only the envelope of the negative peaks of each signal. These negative peaks (see waveforms "e" and "k") are then fed to gated amplifiers 16 and 16A.

Gated amplifiers 16 and 16A are gated by the output of multivibrator 4 and are "on" only during the positive portions of the asymmetrical square wave output shown as waveform "a." The design of multivibrator 4 is such that its output remains negative for a short period at the beginning of each cycle, and since the time for each of its cycles is slightly less than the transit time of pulses reflected from reflective barrier 5, these pulses arrive at a time when gated amplifiers 16 and 16A are gated "off." Thus, the signals produced in response to reflections from barrier 5 are not passed on to the remaining portions of the detection circuits. (See waveforms "e" and "f," and waveforms "k" and "l.")

However, when vehicle 3 enters the detection area (see FIG. 4B) it intercepts part of the beam produced by transmitting transducer T and pulses are reflected from the side of vehicle 3 back to receiving transducer L. Since the transit time of these pulses is considerably shorter than the transit time of pulses normally reflected from barrier 5, they arrive at a time when gated amplifier 16 is "on." These pulses now pass through gated amplifier 16 in the form of series of positive peaks and are fed through D.-C. restorer 17 (see waveform "f") to time constant 18.

The resulting series of positive signals thus passed to time constant 18 in response to the series of ultrasonic pulses reflected from the side of vehicle 3, causes a positive potential to build up at the grids of control tube 19 and R gate generator 20 (see waveform "g"). This causes the conduction of gate generator 20 and the resulting drop of its plate potential (see waveform "h") in turn causes tuned amplifier 12A to be gated "off."

Figure 4A:
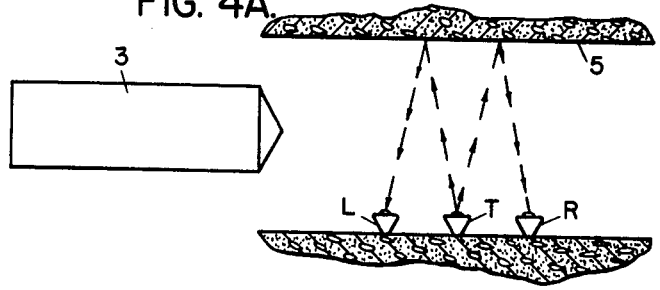
FIGS. 4A, 4B, 4C and 4D illustrate in sequence the passage of a vehicle through the passageway illustrated in FIGS. 3A and 3B.
Figure 4B:
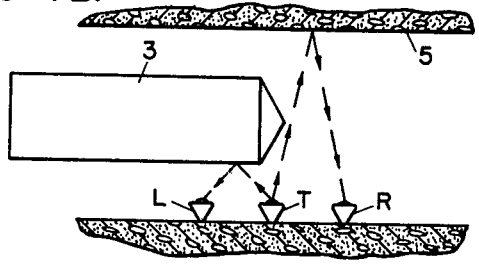
Figure 4C:
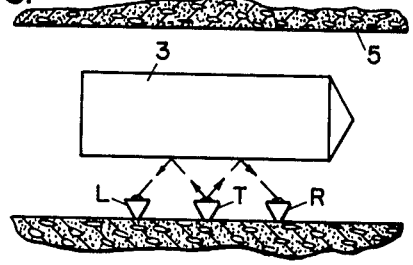

Thus, moments later when vehicle 3 completely intercepts the beam of transmitting transducer T as shown in FIG. 4C, pulses are reflected to receiving transducer R but are not passed beyond gated tuned amplifier 12A, as can be seen from waveform "k."

When the grid of control tube 19 is driven above cut-off, that tube conducts through a circuit including back contact 21 of relay RR, and the windings of relay RL, picking up relay RL. The relay circuits will be discussed further below.

Figure 4D:
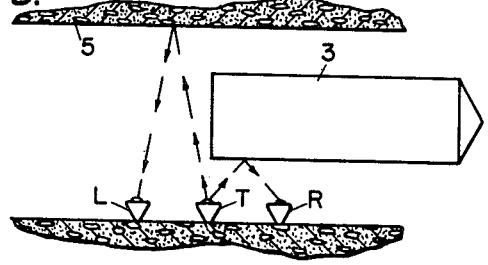

As illustrated in FIG. 4D, as vehicle 3 continues its passage through the detection area, there comes a time when it again only partially intercepts the beam of transmitting transducer and transducer L once again receives pulses reflected from barrier 5. Due to the timing of the multivibrator potential (waveform "a") as explained above, these signals reflected from barrier 5 are not passed by gated amplifier 16. This allows the charge on the grids of control tube 19 and "R" gate generator 20 to leak off below cut-off, resulting in the cutting off of both of these tubes.

At the same time, however, signals reflected from the side of vehicle 3 are still being received by transducer R, and since gated tuned amplifier 12A is once again "on," these signals are passed to the remainder of the detection circuit, passing through gated amplifier 16A and D.-C. restorer 17A, and causing time constant 18A to build up a potential at the grids of control tube 19A and gate generator 20A. This results in the conduction of control tube 19A, completing a stick circuit for relay RL through front contact 24 of relay RL. It should be noted that relay RL is designed to drop away slowly, and, as can be seen from FIG. 6, it remains picked up long enough to be stuck up in the manner just described.

When vehicle 3 finally passes completely out of the detection area, pulses are once again reflected from barrier 5 and received by transducer R, but the resulting signals do not pass gated amplifier 16A, as explained above. The potential at the grid of control tube 19A drops below cut-off (see waveform "m") and relay RL finally drops away.

The operation of relay RL results in the delivery of a pulse to "Direction L to R" counter 25 through front contact 26 of relay RL, resulting in the increase of one unit to that counter in response to the passage of vehicle 3.

It should be obvious that a car traveling in the opposite direction would cause sonic pulses to be reflected first to receiving transducer R, resulting in the condition of control tube 19A and gate generator 20A, causing the pick-up of relay RR through back contact 27 of relay RL. Relay RR would later be stuck in the same manner as that described for relay RL, namely through its own front contact 28. The operation of relay RR momentarily closes its front contact 29, causing the increase by one unit of the count maintained by "Direction R to L" counter 30.

It can thus be seen that the invention herein adapted as just described will monitor traffic in the passageway, providing a separate count for the vehicles traveling in each direction. Counters 25 and 30 may be separate coils of a totalizer, the cars traveling out of the passageway operating one coil, while cars entering the passageway operating the other coil. In this way the counter could at all times reflect either the number of vehicles, of the number of spaces available, within the parking area being monitored.

*Adaptation as Highway Traffic Flow Detector*

FIG. 7 illustrates an adaptation of the invention herein as a flow detector for traffic traveling over a highway in one particular direction. Such a flow detector would be used to control traffic signals at an intersection, or in tunnels, etc. For example, this type of detector could be used at an intersection at which it is desired to give precedence to traffic moving in one general direction, e.g., precedence to east-west traffic over north-south traffic, etc.

Essentially, the circuit for this adaptation is substantially the same as that illustrated in FIG. 5 with the addition of a very slow drop-away relay designated as flow relay RF. As can be seen from FIGS. 2A and 2B, the highway flow detector does not utilize any reflective barrier. Since receiving transducers R and L do not receive pulses which must be gated out, namely, pulses such as those normally received from reflective barrier 5 in the adaptation just described above, the pulse repetition rate of multivibrator 4 can be greatly increased, making it possible to receive several pulses reflected from the side of a vehicle traveling at high speeds. Traffic moving in the non-monitored direction is discriminated on the dual basis of its direction of travel and of its remoteness from the transducers.

As stated above, it is believed that the nature of this circuit can be best understood by means of a description set forth from the standpoint of operation based upon assumed fact situations. The sequence of events illustrated in FIGS. 8A through 8E will now be assumed and the resulting effects upon the circuit illustrated in FIG. 7 will be described. FIGS. 8A through 8E assume that vehicles 31 and 33 are moving in a westerly direction at relatively slow speeds while vehicles 32 and 34 are moving, respectively, easterly and westerly at relatively high speeds.

FIG. 9 shows waveforms taken at selected points of the circuit illustrated in detail in FIG. 5, as well as the sequence of operation of the relays shown in FIG. 7, in response to this assumed situation.

Transducer unit 1 is shown mounted on the south side of the highway to monitor eastbound traffic for purposes of controlling the operation of traffic signal 35. As can be seen from FIG. 8A, the pulses transmitted by transducer T are beamed across the empty highway and normally are not reflected to either of the receiving transducers (L and R). Under the assumed facts, vehicle 31, moving in the non-monitored direction, is the first vehicle to intercept the beam (see FIG. 8B). Pulses reflected from the side of vehicle 31 are reflected first to transducer R and then to transducer L and result in the production of relatively weak signals 36 shown in waveforms "j" and "d," respectively. Due to the relative remoteness of vehicle 31 from transducer unit 1, the resulting signals 36 are too weak to overcome the bias of limiter circuits 14 and 14A, and thus these signals are not passed on to the remaining portions of the detection circuits (see waveforms "e" and "k").

Before vehicle 31 has passed out of the sonic beam emanating from transducer T, vehicle 32, which is eastbound at a relatively high speed passes into the detection area in relatively close proximity to transducer unit 1. As the result of this, relatively strong reflections are received by transducers L and R resulting in the production of large signals 37 shown in waveforms "j" and "d." As was explained above, the receipt of these signals by transducer L results in the operation of control tube 19 and gate generator 20 picking up relay RL and gating out the signals received moments later by transducer R. The picking up of relay RL closes its front contact 41 completing the obvious pick-up circuit for flow relay RF which, in turn, closes its front contact 42.

As was explained above, as vehicle 32 moves out of the beam of transducer T, there is a period during which reflections are no longer received by transducer L but continue to be received by transducer R. This results in the loss of the current maintaining relay RL, but, due to that relay's characteristically slow drop-away, relay RL does not drop away prior to being stuck in its picked-up position in response to conduction of control tube 19A. When vehicle 32 has completely passed out of the detection area (as shown in FIG. 8D) signals are no longer passed by gated amplifiers 16 and 16A, the relay control tubes cut off, and relay RL drops away opening its front contact 41.

This opens the circuit maintaining flow relay RF which, after a considerable delay, drops away. It should be noted that any other traffic following reasonably close behind vehicle 32 would again operate relay RL closing its front contact 41 and maintaining flow relay RF in its picked up position. It can be seen that in this way relay RF provides a steady signal as long as a line of traffic is moving in an eastbound direction.

It is assumed next in FIGS. 8D and 8E that westbound vehicle 34 pulls out to pass slow moving vehicle 33 and passes through the beam of transducer T while in the eastbound lane. The proximity of vehicle 34 to transducer unit 1 results in the production of large signals 38 (waveforms "j" and "d"). These signals are first produced in response to the reflections received by transducer R and result, as explained above, in the picking up of relay RR and the gating "off" of gated tuned amplifier 12. As can be seen from the waveforms diagrammed in FIG. 9, relay RR is picked up and then stuck up in a manner similar to that just explained in relation to relay RL. As long as relay RR remains picked up, it can be seen that its back contact 21 remains open thus assuring that relay RL will not pick up. It can be seen from this that the passage of vehicle 34 in close proximity to transducer unit 1 results in neither the addition of a unit to eastbound traffic counter 41 nor in the picking up of flow relay RF, causing no indication of eastbound traffic in spite of its presence in the eastbound lane.

It should be obvious from the above that the invention herein when adapted for highway use, can detect the passage of high speed vehicles and accurately discriminate between cars traveling in each direction past the monitoring point. In this way, traffic signals and other devices can be controlled in accordance with the flow of traffic in one direction only, remaining unaffected by traffic proceeding in the opposite direction regardless of the latter's proximity to the monitoring transducers.

Having described two specific embodiments of the present invention, it should be understood that the forms illustrated have been selected to facilitate in the disclosure of the invention rather than to limit the number of forms which the invention may assume. Further, it should be understood that various modifications, adaptations, and alterations may be applied to the specific form shown to meet the requirements of practice, without in any manner departing from the spirit and scope of the present invention.

What I claim is:

1. In a system for detecting the presence of vehicles selectively according to either of two generally opposite directions of travel as they pass through a detection zone defined by an energy beam directed substantially transversely across their path the combination comprising, transmitting means for transmitting said beam with a relatively broad spread of said beam in a direction substantially parallel to the direction of travel of said vehicles, first receiving means including a first receiving transducer being positioned to receive a reflection of said transmitted beam from a vehicle as it enters said transmitted beam while traveling in a particular direction, second receiving means including a receiving transducer for receiving reflections of said beam from said vehicle only after said vehicle has moved further through said beam while traveling in said particular direction, each of said receiving means producing a distinctive output signal when said beam is reflected toward its associated receiving transducer, output circuit means being controlled jointly by the outputs of said first and second receiving means to a distinctive condition indicative of the passage of a vehicle through said zone in said particular direction only when said first receiving means receives a reflection of said beam prior to said second receiving means, said output circuit means including indicator means being controlled to a distinctive condition by the output of said first receiving means for indicating the passage of a vehicle in said particular direction, and means controlled by said second receiving means when said second receiving means has received a reflection of said beam at a time when said first receiving means has not yet received a reflection of said beam for preventing said indicator means from being controlled to said distinctive condition by said first receiving means.

2. In a system for detecting the presence of vehicles selectively according to either of two generally opposite directions of travel as they pass through a detection zone defined by an energy beam directed substantially transversely across their path the combination comprising, transmitting means for transmitting said beam with a relatively broad spread of said beam in a direction substantially parallel to the direction of travel of said vehicles, first receiving means including a first receiving transducer being positioned to receive a reflection of said transmitted beam from a vehicle as it enters said transmitted beam while traveling in a particular direction, second receiving means including a receiving transducer for receiving reflections of said beam from said vehicle only after said vehicle has moved further through said beam while traveling in said particular direction, each of said receiving means producing a distinctive output signal when said beam is reflected toward its associated receiving transducer, output circuit means being controlled jointly by the outputs of said first and second receiving means to a distinctive condition indicative of the passage of a vehicle through said zone in said particular direction only when said first receiving means receives a reflection of said beam prior to said second receiving means, and limiter circuit means for each said receiving means for controlling the associated receiving means to supply said distinctive output only when the reflected beam impinging upon the associated receiving transducer has an amplitude at least equalling that expected to be reflected from a vehicle in said detection zone.

3. In a system for detecting vehicles passing in a particular one of two generally opposite directions through a detection zone defined by at least one beam of pulses directed across their path the combination comprising, transmitting means including a transmitting transducer for transmitting said pulses with a relatively wide beam extending along the direction of travel of said vehicles, first and second receiving transducers associated respectively with first and second receiving means and being so positioned and directed that they sequentially and in a predetermined order receive reflections of said transmitted pulses as a vehicle passes in a particular one of said directions through said beam of pulses, each said receiving means providing a distinctive output signal when its associated receiving transducer receives a reflection of said transmitted pulses, indicator circuit means being governed by the outputs of said first and second receiving means and being controlled to a distinctive condition indicative of the passage of a vehicle through said detection zone in said particular direction only when said first and second receiving means provides their distinctive outputs in said predetermined order, said beam impinging when no vehicle is present within said beam upon a fixed reflecting background surface, and gating circuit means for each said receiving means being set into operation by said transmitting means at the time of transmission of each pulse and controlling each receiving means to be non-responsive for a predetermined interval encompassing the expected reception time by each said receiving means of the reflection of the last-transmitted pulse from said fixed reflection surface.

4. In a system for detecting vehicles passing in a particular one of two generally opposite directions through a detection zone defined by at least one beam of pulses directed across their path the combination comprising, transmitting means including a transmitting transducer for transmitting said pulses with a relatively wide beam extending along the direction of travel of said vehicles, first and second receiving transducers associated respectively with first and second receiving means and being so positioned and directed that they sequentially and in a predetermined order receive reflections of said transmitted pulses as a vehicle passes in a particular one of said directions through said beam of pulses, each said receiving means providing a distinctive output signal when its associated receiving transducer receives a reflection of said transmitted pulses, indicator circuit means being governed by the outputs of said first and second receiving means and being controlled to a distinctive condition indicative of the passage of a vehicle through said detection zone in said particular direction only when said first and second receiving means provides their distinctive outputs in said predetermined order, each said receiving means including a limiter circuit means which controls each receiving means to provide an output only in response to reflected pulses received by the associated receiving transducer whose amplitude at least equals that expected to be received from vehicles passing through said designated detection zone.

References Cited in the file of this patent
UNITED STATES PATENTS

| | | |
|---|---|---|
| 2,403,527 | Hershberger | July 9, 1946 |
| 2,594,276 | Barker | Apr. 29, 1952 |
| 2,622,140 | Muller | Dec. 16, 1952 |
| 2,629,082 | Hare | Feb. 17, 1953 |
| 2,653,309 | Hausz | Sept. 22, 1953 |